Nov. 17, 1931.   H. T. HALLOWELL ET AL   1,832,771
MEANS FOR ATTACHING LEGS TO PLATFORMS
Filed Oct. 10, 1929
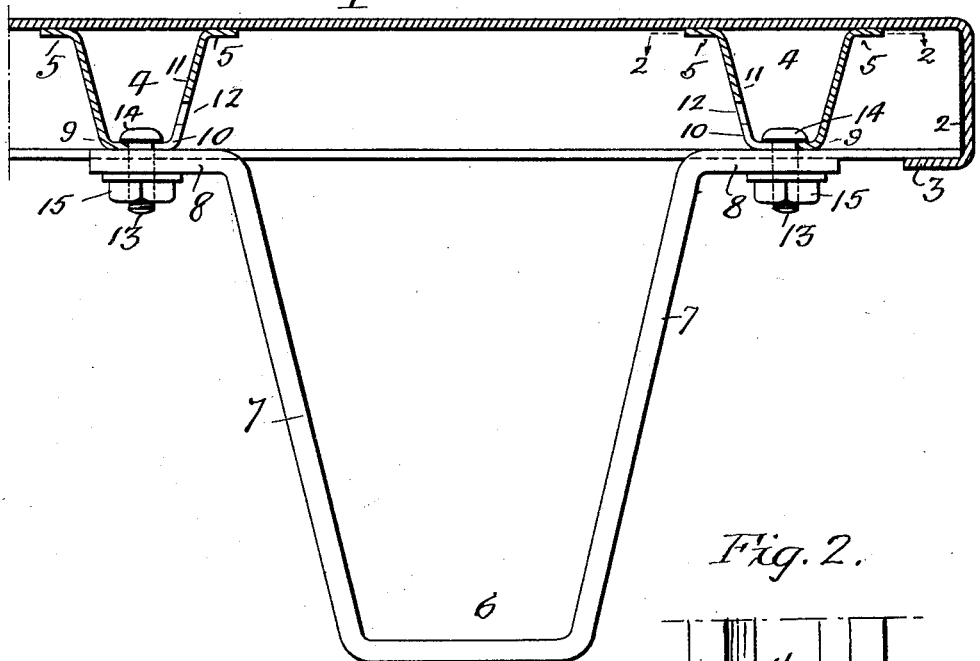
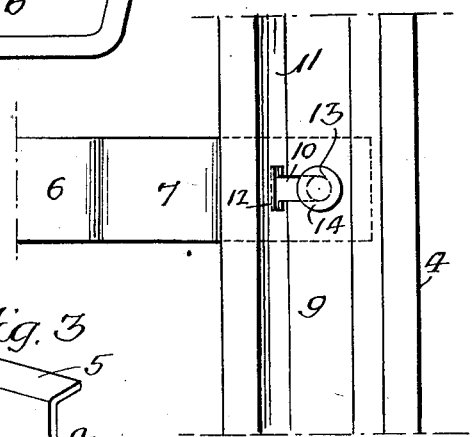
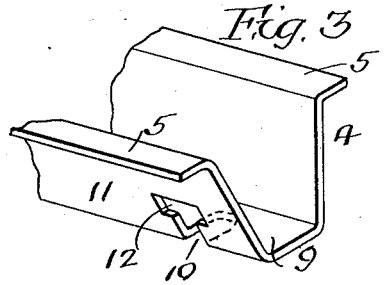
Inventors:
Howard T. Hallowell
Frank Bennett
by their Attorneys Patented Nov. 17, 1931

1,832,771

UNITED STATES PATENT OFFICE

HOWARD T. HALLOWELL AND FRANK BENNETT, OF JENKINTOWN, PENNSYLVANIA, ASSIGNORS TO STANDARD PRESSED STEEL CO., OF JENKINTOWN, PENNSYLVANIA, A CORPORATION OF PENNSYLVANIA

MEANS FOR ATTACHING LEGS TO PLATFORMS

Application filed October 10, 1929. Serial No. 398,783.

Our invention relates to certain improvements in means of attaching legs to platforms used for supporting merchandise and other material in warehouses and factories.

One object of our invention is to provide means for firmly securing the legs to the platform.

A further object of the invention is to provide means for detachably securing the legs so that the platform can be shipped from the factory to its destination, with its legs detached, the legs being readily assembled. The improved fastening means enables the legs to be readily attached to the platform after it reaches its destination.

In the accompanying drawings:

Fig. 1 is a sectional view of the body of a platform, showing one leg of the platform secured thereto;

Fig. 2 is a plan view on the line 2—2, Fig. 1, the floor plate of the platform being removed; and Fig. 3 is a detached perspective view of one of the channel members of the platform.

Referring to the drawings, 1 is a sheet metal plate forming the floor of the platform. This plate is flanged at 2 and the flange is preferably inturned as at 3. 4 are channel beams bent at their upper ends to form pads 5, which are secured to the underside of the floor plate and to each end flange of the said plate by welding or by other means. Beams of other shapes may be used, depending upon the size of the platform and the weights which are to be carried by the platform.

6 is one of the legs of the platform, which support the platform and give distance above the floor. This distance is preferably such that a carrying truck can be inserted under the platform between the legs so that the platform can be transferred from one position to another. These legs are U-shape in form in the present instance and the side members 7 are inclined as shown and the upper ends of the legs have extensions 8, which are secured to the beams of the platform.

In order that the platform may be shipped from the factory within as small a space as possible, the legs are made detachable, and the main object of our invention is to provide a ready means for securing the legs into position without materially weakening the structure of the platform.

In the base 9 of the channel member 4 is a slot 10, which is continued into a side member 11 of the channel and is enlarged as at 12, so that a headed bolt 13 can be inserted through the slot, the head 14 of the bolt passing through the enlarged portion 12 of the slot, while the body of the bolt passes through the narrow slot 10, which is substantially the same diameter as the bolt. When the bolt is in position in the slot, the leg is located so that the bolt will pass through a hole in the extension 8 of the leg, then the nut 15 is applied securing the leg to the channel member 4, as shown in Fig. 1.

It will be noticed in referring to Fig. 1, that the slotted sides of the channel members face each other, and the other sides of the channel members are solid, so that when weights are placed upon the platform which would tend to spread the legs, these side members resist the strains on the bolts and prevent the legs spreading.

We claim:

1. The combination in a platform, of a floor made of sheet metal and having flanges at the side and ends; channel members extending across the platform from one side flange to the other, under the front and secured thereto, each channel member having slots at the base for the passage of securing bolts, said slots extending up one side of the channel member and being enlarged at their upper ends; metallic legs having lateral extensions, said extensions being perforated; and bolts extending through the slots in the channel members and holes in the legs, securing the legs to the channel members.

2. The combination in a platform, of a sheet metal floor; two channel beams extending from one side of the platform to the other and secured to the under side of the platform; a leg near each side of the platform, each channel member having a slot at the base thereof, said slot extending into the side members of the channel sections, each slot being enlarged at its upper end, the slotted channel members facing each other; legs having lateral extensions, each extension having a hole therein; and bolts passing through the slots in the channel members and through the holes in the extensions of the legs, the solid sides of the channel members resisting any strains placed upon the legs.

HOWARD T. HALLOWELL.
FRANK BENNETT.